US008504680B1

(12) United States Patent
Hernacki et al.

(10) Patent No.: US 8,504,680 B1
(45) Date of Patent: Aug. 6, 2013

(54) AUTOMATICALLY ADJUSTING POLLING INTERVALS BASED ON REMOTE ADMINISTRATIVE ACTIVITY

(75) Inventors: Brian Hernacki, Moutain View, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 402 days.

(21) Appl. No.: 12/343,377

(22) Filed: Dec. 23, 2008

(51) Int. Cl.
*G06F 15/173* (2006.01)

(52) U.S. Cl.
USPC ............................ 709/224; 709/228; 709/229

(58) Field of Classification Search
USPC ........................................................ 709/224
See application file for complete search history.

(56) References Cited

U.S. PATENT DOCUMENTS

| | | | |
|---|---|---|---|
| 2002/0178396 A1* | 11/2002 | Wong et al. | 714/4 |
| 2002/0184555 A1* | 12/2002 | Wong et al. | 714/4 |
| 2003/0041107 A1* | 2/2003 | Blattner et al. | 709/204 |
| 2003/0093521 A1* | 5/2003 | Schlonski et al. | 709/224 |
| 2003/0169761 A1* | 9/2003 | Duncan et al. | 370/449 |
| 2005/0210128 A1* | 9/2005 | Cannon et al. | 709/224 |
| 2007/0214256 A1* | 9/2007 | Castaneda et al. | 709/224 |
| 2008/0294731 A1* | 11/2008 | Roy | 709/206 |
| 2008/0301243 A1* | 12/2008 | Cohen et al. | 709/206 |
| 2009/0125627 A1* | 5/2009 | Ford | 709/227 |
| 2010/0281153 A1* | 11/2010 | Chiu et al. | 709/223 |

* cited by examiner

*Primary Examiner* — Tauqir Hussain
(74) *Attorney, Agent, or Firm* — Brill Law Office; Jeffrey Brill

(57) ABSTRACT

It is detected when an administrator begins or finishes performing remote administrative activity. In response, the polling interval is modified. When the level of remote administrative activity increases, the polling interval is decreased, thereby directing the managed clients to poll the server more frequently. When the level of remote administrative activity decreases, the polling interval is increased, thereby directing the managed clients to poll the server less frequently. By dynamically adjusting the polling interval based on remote administrative activity, a balance is struck between scalability and usability.

20 Claims, 2 Drawing Sheets

AUTOMATICALLY ADJUSTING POLLING INTERVALS BASED ON REMOTE ADMINISTRATIVE ACTIVITY

TECHNICAL FIELD

This invention pertains generally to remote administration of computing devices, and more specifically to automatically adjusting polling intervals based on remote administrative activity.

BACKGROUND

Client administration technology enables an individual user to become the remote administrator of a group of managed computing devices. Note that in this context a "remotely" administered computing device can refer to a computer on the other side of the room, the other side of the world, or anywhere in between. For example, the most computer knowledgeable person in a family could remotely manage all of the computers belonging to his immediate and extended family members. This could include all of the computers in his home (e.g., those used by his wife and children) as well as those belonging to his parents, in-laws and siblings, located in other states or even other countries.

Remote administration can refer to remotely performing activities for a managed client, such as shutting down or rebooting, modifying system services or settings, or installing software. Remote administration can also include interactive remote control of a managed client in real time, to trouble shoot problems or otherwise provide assistance.

Remote administration involves the various managed clients checking in with a server at specified intervals, using a traditional polling model. By transmitting polling inquiries to the server at specified intervals, each managed client is in effect prompting the server to see whether it has any remote administrative activity to execute on that managed client. Because each managed client is polling at a given interval, the server is prompted to separately administer each of the managed clients in turn.

In such polling models, the server calculates a default polling interval for the managed clients. The polling interval is typically based on the number of managed clients and the amount of available bandwidth. The polling interval is calculated so as to leave a predetermined amount of headroom available for real time administration sessions with the managed clients (e.g., 20%).

Responsive to a managed client polling the server according to the polling interval, the server returns a polling response to the managed client. In order to change the polling interval, the server can include a new polling interval for the client to use for subsequent polling inquiries. In order to maintain the existing polling interval, the server can either not return a polling interval, or include an unchanged polling interval in the polling response. By changing or maintaining the polling interval as desired, the server directs the managed clients to stay in synchronization.

Polling by managed clients provides some very tangible advantages, and makes the type of remote administration described above practicable. However, polling at a low interval (i.e., frequent polling) significantly increases the load on the server, thereby slowing down the server and affecting the feasibility of adding more managed clients. On the other hand, polling at a high interval (low frequency) results in long periods of time between remote administrative actions directed at managed clients, thereby decreasing end user satisfaction. It would be desirable to address these issues.

SUMMARY

It is detected when an administrator begins or finishes performing remote administrative activity. Responsive to these detected changes in the level of remote administrative activity, the polling interval 101 is modified. When the administrator is actively engaging in remote administrative activity, the managed clients are directed to poll the server more frequently, to improve the performance of the remote administration. On the other hand, when the administrator is not actively engaging in remote administrative activity, the managed clients are directed to poll the server less frequently, thereby lowering the computational demand on the server. By adjusting the polling interval based on remote administrative activity, the end user experience at the managed client level is greatly improved, while at the same time the server can support a larger number of managed clients than would be practicable if the polling interval were always as short as during active administration sessions. Thus, a balance is struck between scalability and usability by dynamically adjusting the polling interval based on the level of remote administrative activity.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
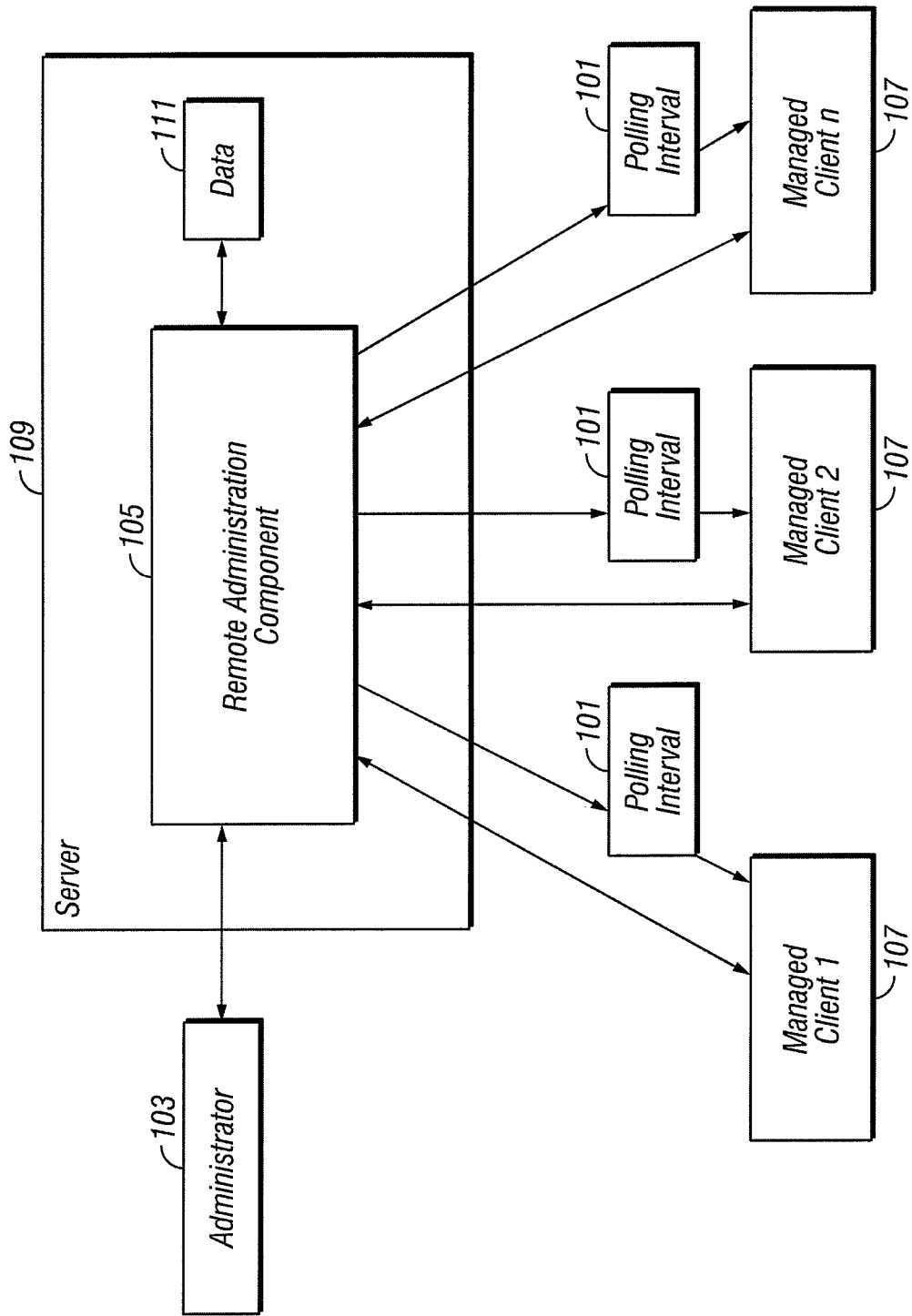
FIG. 1 is a block diagram illustrating a system for automatically adjusting polling intervals based on remote administrative activity, according to some embodiments of the present invention.

FIG. 1 illustrates a system for automatically adjusting polling intervals 101 based on remote administrative activity, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, an administrator 103 uses a remote administration component 105 to remotely service managed clients 107. The remote administration component 105 is illustrated as running on a server 109, but in other embodiments can run partially or entirely on a separate local computer used by the administrator 103. In some embodiments, the server 109 and the administrator's 103 local computer are the same physical computing device (as illustrated). In other embodiments, the administrator 103 interacts with a remote server 109, for example via a software interface (not illustrated). It is to be understood further that although the server 109 is illustrated in the form of a single physical computing device, the server 109 functionality can be distributed between multiple computing devices as desired.

While the administrator 103 is not actively providing service to remote clients 107, the remote clients 107 poll the server 109 at a default polling interval 101. The specific default polling interval 101 to use is a variable design parameter, but is typically high enough so as not to create too great a computing resource burden on the server 109. The remote administration component 105 detects when the administrator 103 initiates remote administrative activity. Such remote administrative activity can comprise, for example, logging into the remote administration component 105, starting an interactive session with a managed client 107, responding to a request from a managed client 107, checking managed client 107 status, etc. In response to the detected remote administrative activity, the polling interval 101 for the managed client(s) 107 under active management by the administrator 103 is automatically decreased (thereby increasing the polling frequency). This is done so as to speed up the interaction between the server 109 and the managed client(s) 107 during the period of time when the administrator 103 is actively engaged in remote administrative activity.

In order to apply the decreased polling interval 101, the server 109 communicates the decreased polling interval 101 to the managed client(s) 107 under active management, for example in the polling responses as described above. The degree to which to decrease the polling interval 101 is a variable design parameter, but typically the decreased polling interval 101 is low enough to provide fast service to managed clients 107 during periods of active administration.

The remote administration component 105 detects when the administrator 103 ends an administrative session (as indicated, for example, by the administrator 103 logging off the remote administration component 105, shutting down the remote administration component 105, or not executing any activity on the remote administration component 105 for a defined timeout period). In response, the polling interval 101 is adjusted back to the longer, default setting (or another longer setting, as desired). Returning to the default polling interval 101 slows down remote administrative activity, but because the administrator 103 is not actively operating the remote administration component 105, the slower interaction time can be tolerated.

It is to be understood that polling intervals 101 can be increased and/or decreased all at once, and/or progressively over time as desired. In other words, in response to detecting a change in remote administrative activity, the remote administration component 105 can simply calculate a new polling interval and transmit that to the managed clients 107, or the remote administration component 105 can calculate a new polling interval 101 and multiple intermediate polling intervals 101. In the later scenario, each intermediate polling interval 101 has a successive value between that of the original and the new polling intervals 101. The multiple intermediate polling intervals 101 and then the new polling interval 101 are successively transmitted to the managed clients 107 over time, so as to progressively adjust the polling interval 101.

By modifying the polling interval 101 based on remote administrative activity, the end user experience at the managed client 107 level is greatly improved, while at the same time the server 109 can support a larger number of managed clients 107 (i.e., scale to a much higher level) than would be practicable if the polling interval 101 were always as short as during active administration sessions. Thus, a balance is struck between scalability and usability by dynamically adjusting the polling interval 101 based on the level of remote administrative activity. This enables the system to scale but still appear highly responsive to end users.

In some embodiments, other data 111 indicative of a change in a level of remote administrative activity is used to determine when to adjust the polling interval 101. This data 111 can include managed client 107 status. For example, the administrator 103 is more likely than normal to execute remote administrative activity when a managed client 107 is in an alert or emergency state. Thus, the polling interval 101 could be decreased responsive to one or more managed clients 107 entering or being in an alert or emergency state. Another type of data 111 that can be taken into account is remote administrative activity history. More specifically, the remote administration component 105 can detect patterns in past remote administrative activity, and from these patterns infer the likelihood of upcoming changes to the level of remote administrative activity. For example, if a given administrator 103 typically logs into the remote administration component 105 every Monday morning around 10 AM, the remote administration component 105 can detect this, and predicatively decrease the polling interval 101 on Monday mornings at 9:55 AM. Of course, these are just examples of data 111 that can be taken into account in setting the polling interval 101. Any data 111 that indicates a likelihood of an upcoming change in the level of remote administrative activity can be utilized in this manner. Such data 111 can be used in combination with and/or instead of detecting actual changes in the level of remote administrative activity, as desired.

Figure 2:
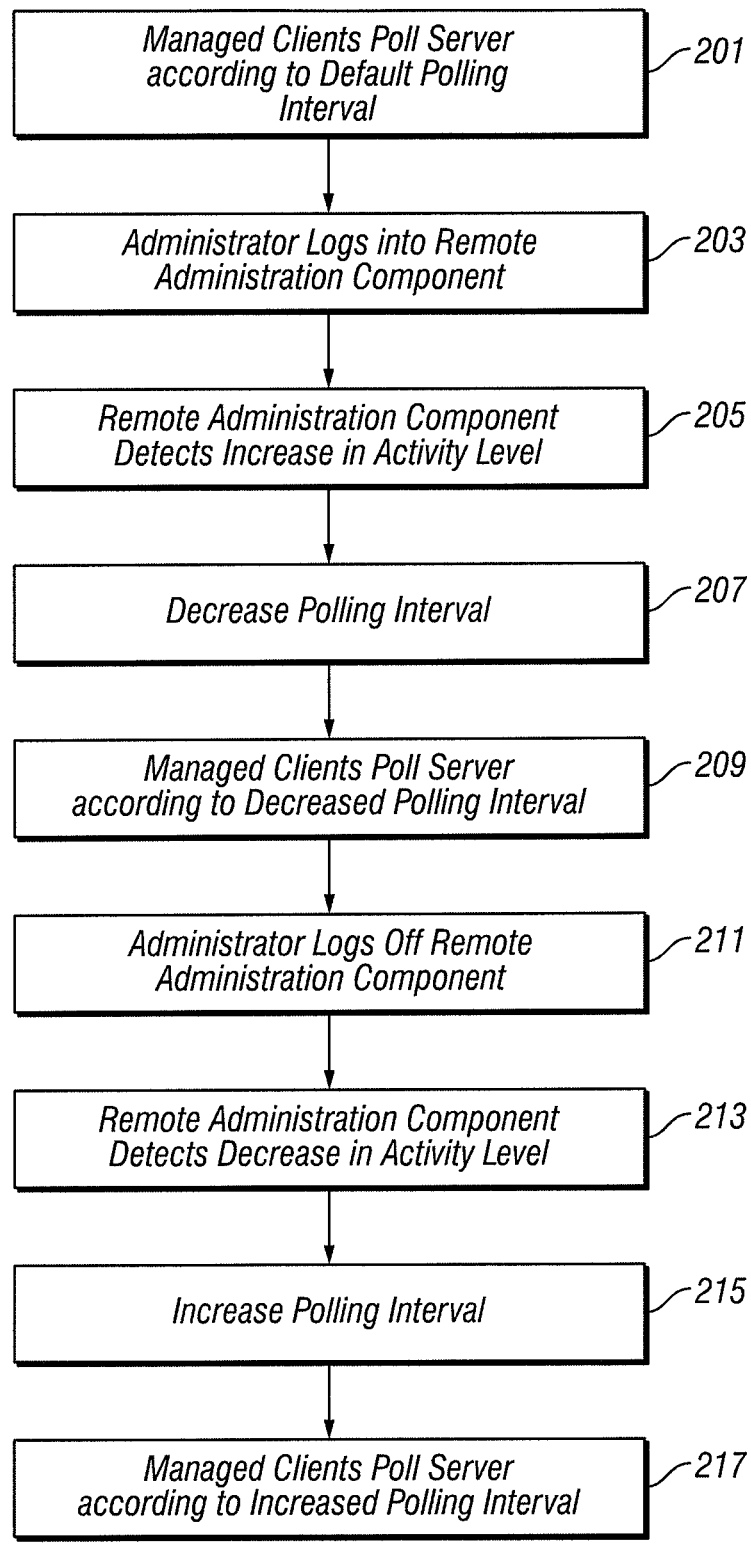
FIG. 2 is a flowchart illustrating steps for automatically adjusting polling intervals based on remote administrative activity, according to one embodiment of the present invention.

FIG. 2 illustrates automatically adjusting polling intervals 101 (FIG. 1) in a remote administration context, according to one embodiment of the present invention. A plurality of managed clients 107 (FIG. 1) poll 201 a server 109 (FIG. 1) according to a default polling interval 101 (FIG. 1). An administrator 103 (FIG. 1) logs 203 into a remote administration component 105 (FIG. 1) in order to remotely administer the managed clients 107 (FIG. 1). The remote administration component 105 (FIG. 1) detects 205 the increase in remote administrative activity level, and in response decreases 207 the polling interval 101 (FIG. 1), to provide for faster interaction time between the server 109 (FIG. 1) and the managed clients 107 (FIG. 1). The managed clients 107 (FIG. 1) proceed to poll 209 the server 109 (FIG. 1) according to the decreased polling interval 101 (FIG. 1). After a period of time, the administrator 103 (FIG. 1) finishes the remote administration session, and logs 211 off the remote administration component 105 (FIG. 1). The remote administration component 105 (FIG. 1) detects 213 this change in remote administrative activity level as well, and this time increases 215 the polling interval 101 (FIG. 1) in response. The managed clients 107 (FIG. 1) now poll 217 the server 109 (FIG. 1) according to the increased polling interval 101 (FIG. 1).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies, data structures and other aspects of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable storage media as computer program products. Any form of tangible computer readable storage medium can be used in this context, such as magnetic or optical storage media. As used herein, the term "computer readable storage medium" does not mean an electrical signal separate from an underlying physical medium. Additionally, software portions of the present invention can be instantiated (for example as object code or executable images) within the memory of any computing device. As used herein, the terms "client" and "server" simply mean one or more computers configured to execute the described functionality. Accordingly, the disclosure of the present invention is intended to be illustrative, but not limiting, of the scope of the invention, which is set forth in the following claims.

What is claimed is:

1. A method for automatically adjusting polling intervals by a server computer performing remote administrative activity on a managed client computer, the method comprising the steps of:

receiving polling inquiries at a server computer from managed client computers according to a first polling interval, a polling inquiry allowing remote administrative activity to be executed by the server computer on a managed client computer;

detecting an indication of a change in status on the managed client computer from the server computer, wherein the change in status will cause a change in a level of actual remote administrative activity performed by the server computer on at least one of a plurality of managed client computers;

in response to detecting the indication of a change in the level of actual remote administrative activity, automatically calculating a second polling interval for polling inquiries correlating to the level of actual remote administrative activity, by the server computer, the second polling interval to be used by the at least one of the plurality of managed client computers, comprising:

in response to detecting an increase in the level of actual remote administrative activity, automatically calculating a decreased polling interval, and in response to detecting a decrease in the level of actual remote administrative activity, automatically calculating an increased polling interval;

transmitting the second polling interval to the at least one of the plurality of managed client computers from the server computer; and receiving polling inquiries at the server computer from the at least one of the plurality of managed client computers according to the second polling interval.

2. The method of claim 1 wherein detecting an indication of a change in a level of remote administrative activity and automatically calculating a second polling interval further comprise:

detecting the increase in the level of remote administrative activity, by a server computer.

3. The method of claim 2 wherein detecting an increase in the level of remote administrative activity further comprises detecting, by a server computer, performance of at least one step from a group of steps consisting of:

an administrator logging into a remote administration component;

an administrator starting an interactive session with a managed client computer;

an administrator responding to a request from a managed client computer; and an administrator checking managed client status.

4. The method of claim 1 wherein detecting an indication of a change in a level of remote administrative activity and automatically calculating a second polling interval further comprise:

detecting the decrease in the level of remote administrative activity, by a server computer.

5. The method of claim 4 wherein detecting a decrease in the level of remote administrative activity further comprises detecting, by a server computer, performance of at least one step from a group of steps consisting of:

an administrator logging off a remote administration component;

an administrator shutting down a remote administration component; and an administrator not executing any remote administrative activity for a defined period of time.

6. The method of claim 1 wherein automatically calculating a second polling interval and transmitting the second polling interval to the at least one of the plurality of managed client computers further comprise:

calculating a plurality of intermediate polling intervals, each of the intermediate polling intervals having a successive value between that of the first and the second polling intervals, by a server computer;

transmitting successive ones of the intermediate polling intervals to the at least one of the plurality of managed client computers, by a server computer; and subsequently transmitting the second polling interval to the at least one of the plurality of managed client computers, by a server computer.

7. The method of claim 1 wherein detecting an indication of a change in a level of remote administrative activity further comprises:

detecting data that indicates a likelihood of an upcoming change in the level of remote administrative activity, by a server computer.

8. The method of claim 7 wherein detecting data that indicates a likelihood of an upcoming change in the level of remote administrative activity further comprises detecting, by a server computer, performance of at least one step from a group of steps consisting of:
- at least one managed client computer entering an alert state;
- at least one managed client computer entering an emergency state;
- at least one managed client computer being in an alert state;
- at least one managed client computer being in an emergency state;
- a pattern in past remote administrative activity.

9. At least one non-transitory computer readable storage medium storing a computer program product for, when executed by a processor, automatically adjusting polling intervals by a server computer performing remote administrative activity on a managed client computer, the computer program product comprising:
- program code for receiving polling inquiries at a server computer from managed client computers according to a first polling interval, a polling inquiry allowing remote administrative activity to be executed by the server computer on a managed client computer;
- program code for detecting an indication of a change in status on the managed client computer from the server computer, wherein the change in status will cause a change in a level of actual remote administrative activity performed by the server computer on at least one of a plurality of managed client computers;
- program code for, in response to detecting the indication of a change in the level of actual remote administrative activity, automatically calculating a second polling interval for polling inquiries correlating to the level of actual remote administrative activity, by the server computer, the second polling interval to be used by the at least one of the plurality of managed client computers, comprising:
  - in response to detecting an increase in the level of actual remote administrative activity, automatically calculating a decreased polling interval, and
  - in response to detecting a decrease in the level of actual remote administrative activity, automatically calculating an increased polling interval;
- program code for transmitting the second polling interval to the at least one of the plurality of managed client computers from the server computer; and
- program code for receiving polling inquiries at the server computer from the at least one of the plurality of managed client computers according to the second polling interval.

10. The computer program product of claim 9 wherein the program code for detecting an indication of a change in a level of remote administrative activity and for automatically calculating a second polling interval further comprises:
- program code for detecting the increase in the level of remote administrative activity.

11. The computer program product of claim 10 wherein the program code for detecting an increase in the level of remote administrative activity further comprises program code for detecting performance of at least one step from a group of steps consisting of:
- an administrator logging into a remote administration component;
- an administrator starting an interactive session with a managed client computer;
- an administrator responding to a request from a managed client computer; and
- an administrator checking managed client status.

12. The computer program product of claim 9 wherein the program code for detecting an indication of a change in a level of remote administrative activity and for automatically calculating a second polling interval further comprises:
- program code for detecting the decrease in the level of remote administrative activity.

13. The computer program product of claim 12 wherein the program code for detecting a decrease in the level of remote administrative activity further comprises program code for detecting performance of at least one step from a group of steps consisting of:
- an administrator logging off a remote administration component;
- an administrator shutting down a remote administration component; and
- an administrator not executing any remote administrative activity for a defined period of time.

14. The computer program product of claim 9 wherein the program code for automatically calculating a second polling interval and for transmitting the second polling interval to the at least one of the plurality of managed client computers further comprises:
- program code for calculating a plurality of intermediate polling intervals, each of the intermediate polling intervals having a successive value between that of the first and the second polling intervals;
- program code for transmitting successive ones of the intermediate polling intervals to the at least one of the plurality of managed client computers; and
- program code for subsequently transmitting the second polling interval to the at least one of the plurality of managed client computers.

15. The computer program product of claim 9 wherein the program code for detecting an indication of a change in a level of remote administrative activity further comprises:
- program code for detecting data that indicates a likelihood of an upcoming change in the level of remote administrative activity.

16. The computer program product of claim 15 wherein the program code for detecting data that indicates a likelihood of an upcoming change in the level of remote administrative activity further comprises program code for detecting performance of at least one step from a group of steps consisting of:
- at least one managed client computer entering an alert state;
- at least one managed client computer entering an emergency state;
- at least one managed client computer being in an alert state;
- at least one managed client computer being in an emergency state;
- a pattern in past remote administrative activity.

17. A computer system for automatically adjusting polling intervals by a server computer performing remote administrative activity on a managed client computer, the computer system comprising:
- a hardware implemented remote administration component for:
  - receiving polling inquiries at a server computer from managed client computers, according to a first polling interval, a polling inquiry allowing remote administrative activity to be executed by the server computer on a managed client computer;
  - detecting an indication of a change in status on the managed client computer from the server computer, wherein the change in status will cause a change in a level of actual remote administrative activity performed by the server computer on at least one of a plurality of managed client computers;

in response to detecting the indication of a change in the level of actual remote administrative activity, automatically calculating a second polling interval for polling inquiries correlating to the level of actual remote administrative activity, by the server computer, the second polling interval to be used by the at least one of the plurality of managed client computers, comprising:

in response to detecting an increase in the level of actual remote administrative activity, automatically calculating a decreased polling interval, and in response to detecting a decrease in the level of actual remote administrative activity, automatically calculating an increased polling interval;

transmitting the second polling interval to the at least one of the plurality of managed client computers from the server computer; and receiving polling inquiries at the server computer from the at least one of the plurality of managed client computers, according to the second polling interval.

18. The computer system of claim 17 wherein detecting an indication of a change in a level of remote administrative activity and for automatically calculating a second polling interval further comprise:

detecting the increase in the level of remote administrative activity.

19. The computer system of claim 17 wherein detecting an indication of a change in a level of remote administrative activity and for automatically calculating a second polling interval further comprise:

detecting the decrease in the level of remote administrative activity.

20. The computer system of claim 17 wherein detecting an indication of a change in a level of remote administrative activity further comprise:

detecting data that indicates a likelihood of an upcoming change in the level of remote administrative activity.

* * * * *